US009656356B2

(12) United States Patent
Pemberton

(10) Patent No.: US 9,656,356 B2
(45) Date of Patent: May 23, 2017

(54) WINDOW UNIT ASSEMBLY STATION AND METHOD

(71) Applicant: Guardian IGU, LLC, Avoca, WI (US)

(72) Inventor: Corey E. Pemberton, Prairie Du Sac, WI (US)

(73) Assignee: GUARDIAN IG, LLC, Sun Prairie, WI (US)

( * ) Notice: Subject to any disclaimer, the term of this patent is extended or adjusted under 35 U.S.C. 154(b) by 339 days.

(21) Appl. No.: 14/160,328

(22) Filed: Jan. 21, 2014

(65) Prior Publication Data

US 2014/0201969 A1    Jul. 24, 2014

Related U.S. Application Data

(60) Provisional application No. 61/755,263, filed on Jan. 22, 2013, provisional application No. 61/781,597, filed on Mar. 14, 2013.

(51) Int. Cl.
*B23P 19/10* (2006.01)
*B23P 19/04* (2006.01)
(Continued)

(52) U.S. Cl.
CPC .......... *B23P 19/04* (2013.01); *E06B 3/67386* (2013.01); *E06B 3/6775* (2013.01); *Y10T 29/49826* (2015.01); *Y10T 29/53313* (2015.01)

(58) Field of Classification Search
CPC .............. B25B 1/00; B25B 5/00; B25B 11/02
See application file for complete search history.

(56) References Cited

U.S. PATENT DOCUMENTS

| 4,406,726 A | 9/1983 | Lisec |
| 4,434,024 A | 2/1984 | Lisec |

(Continued)

FOREIGN PATENT DOCUMENTS

| CN | 102667044 A | 9/2012 |
| CN | 102701606 A | 10/2012 |
| EP | 0056762 A | 7/1982 |

OTHER PUBLICATIONS

International Search Report and Written Opinion for International Application No. PCT/US2014/012498 mailed May 13, 2014.

*Primary Examiner* — Lee D Wilson
(74) *Attorney, Agent, or Firm* — Remarck Law Group PLC

(57) ABSTRACT

An insulated glass unit (IGU) assembly station can include an assembly table, a conveyor assembly, and a projection component. The assembly table can have a table surface configured to receive first and second transparent window components, the table surface being positioned at an incline relative to a vertical position. The conveyor assembly can be configured to translate the first and second transparent window components along a translation pathway from a first end of the table surface to a second end of the table surface, the translation pathway being substantially parallel to the table surface. The projection component can be adjacent to the assembly table and can be configured to engage the first transparent window component to translate at least a bottom portion of the first transparent window component between an initial position and a first assembly position offset from the translation pathway.

20 Claims, 16 Drawing Sheets

(51) Int. Cl.
*E06B 3/673* (2006.01)
*E06B 3/677* (2006.01)

(56) References Cited

U.S. PATENT DOCUMENTS

| | | |
|---|---|---|
| 4,495,023 A | 1/1985 | Lisec |
| 4,716,686 A * | 1/1988 | Lisec ................. B24B 7/12 |
| | | 198/339.1 |
| 4,743,336 A | 5/1988 | White |
| 4,753,096 A | 6/1988 | Wallis |
| 4,769,105 A | 9/1988 | Lisec |
| 4,780,164 A | 10/1988 | O'Shaughnessy |
| 4,803,775 A | 2/1989 | Lisec |
| 4,836,005 A | 6/1989 | Lisec |
| 4,885,926 A | 12/1989 | Lisec |
| 4,886,095 A | 12/1989 | Lisec |
| 4,886,410 A | 12/1989 | Lisec |
| 4,949,666 A | 8/1990 | Lisec |
| 5,080,146 A | 1/1992 | Arasteh |
| 5,280,832 A | 1/1994 | Lisec |
| 5,295,292 A | 3/1994 | Leopold |
| 5,361,476 A | 11/1994 | Leopold |
| 5,394,725 A | 3/1995 | Lisec |
| 5,413,156 A | 5/1995 | Lisec |
| 5,573,618 A | 11/1996 | Rueckheim |
| 5,725,205 A * | 3/1998 | O'Berg ................. B25H 1/00 |
| | | 269/289 R |
| 5,888,341 A | 3/1999 | Lafond |
| 6,148,890 A | 11/2000 | Lafond |
| 6,158,483 A | 12/2000 | Trpkovski |
| 6,197,129 B1 | 3/2001 | Zhu |
| 7,008,492 B2 | 3/2006 | Lisec |
| 7,275,570 B2 | 10/2007 | McGlinchy |
| 7,448,246 B2 | 11/2008 | Briese |
| 7,866,033 B2 | 1/2011 | James |
| 7,901,526 B2 | 3/2011 | James |
| 8,381,382 B2 | 2/2013 | Wunnicke et al. |
| 8,397,780 B2 | 3/2013 | Vianello |
| 8,474,400 B2 | 7/2013 | McGlinchy |
| 8,857,698 B2 | 10/2014 | Bouesnard et al. |
| 2003/0097818 A1 | 5/2003 | Almasy |
| 2003/0178127 A1 | 9/2003 | Lisec |
| 2004/0056400 A1 * | 3/2004 | Ghuman ............. B23P 21/004 |
| | | 269/71 |
| 2005/0121844 A1 * | 6/2005 | Fredrickson ........... B25B 11/02 |
| | | 269/37 |
| 2006/0201606 A1 | 9/2006 | Lisec |
| 2010/0065580 A1 | 3/2010 | McGlinchy |
| 2011/0062642 A1 * | 3/2011 | Yabe ................. B23Q 1/5437 |
| | | 269/37 |
| 2012/0011722 A1 | 1/2012 | Briese |
| 2012/0234466 A1 | 9/2012 | Balbi et al. |
| 2012/0266455 A1 | 10/2012 | Schuler et al. |

* cited by examiner

WINDOW UNIT ASSEMBLY STATION AND METHOD

CROSS-REFERENCE TO RELATED APPLICATIONS

This application claims the benefit of U.S. Provisional Application No. 61/755,263, filed on Jan. 22, 2013 and U.S. Provisional Application No. 61/781,597, filed on Mar. 14, 2013. The entire disclosure of each of the above applications is incorporated herein by reference.

FIELD OF THE INVENTION

The present disclosure relates to the manufacture of window units and, more particularly, to a window unit assembly station and method.

BACKGROUND

This section provides background information related to the present disclosure which is not necessarily prior art.

An insulated glass unit (IGU) includes two or more transparent window components, e.g., panes of glass, arranged such that there is a space between each of the transparent window components. One or more physical spacers can be inserted between the transparent window components to create the spaces between the transparent window components. The spaces can be filled with air or another gas, e.g., argon, or pumped down to a near-vacuum pressure. The IGU can then be sealed to prevent air and/or moisture from entering the spaces between the transparent window components. IGUs can provide for decreased heat transfer between the two or more transparent window components, which results in better thermal insulation by the IGUs.

SUMMARY

This section provides a general summary of the disclosure, and is not a comprehensive disclosure of its full scope or all of its features.

An insulated glass unit (IGU) assembly station is presented. The IGU assembly station can include an assembly table having a table surface configured to receive first and second transparent window components, the table surface being positioned at an incline relative to a vertical position. The IGU assembly station can include a conveyor assembly configured to translate the first and second transparent window components along a translation pathway from a first end of the table surface to a second end of the table surface, the translation pathway being substantially parallel to the table surface. The IGU assembly station can also include a projection component adjacent to the assembly table and configured to engage the first transparent window component to translate at least a bottom portion of the first transparent window component between an initial position and a first assembly position offset from the translation pathway.

In some embodiments, the projection component has a receiving surface between first and second edges, the receiving surface being configured to receive a bottom edge of the first transparent window component, wherein the projection component further includes an extension surface configured to merge with the translation pathway upon extension of the projection component to the first assembly position.

In other embodiments, the IGU assembly station further includes a press bar extending substantially across the table surface and translatable both substantially parallel to the table surface and substantially perpendicular to the table surface, the press bar being configured to both push a front surface of the first transparent window component and support a back surface of the first transparent window component.

In some embodiments, the conveyor assembly is configured to translate the second transparent window component to a second assembly position where the second transparent window component is substantially parallel to the table surface and behind the first transparent window component after the first transparent window component is extended to the first assembly position, wherein the second transparent window component has a spacer frame attached thereto.

In other embodiments, in response to the conveyor assembly translating the second transparent window component to the second assembly position, the press bar is configured to push against the front surface of the first transparent window component to connect at least a top portion of the first transparent window component to at least a top portion of the spacer frame to form a partially-mated IGU.

In some embodiments, the partially-mated IGU includes a gap between the bottom portion of the first transparent window component and a bottom portion of the spacer frame for receiving gas to form a gas-filled IGU.

In other embodiments, the assembly table has a groove through the table surface, wherein the press bar includes a finger extending from the press bar towards the table surface, wherein the finger is configured to be received by the groove at the initial position of the first transparent window component, and wherein the finger is configured to engage a top edge of the first transparent window component and to support the back surface of the first transparent window component when the first transparent window component is offset from the table surface at the first assembly position.

In some embodiments, in response to the conveyor assembly translating the second transparent window component to the second assembly position, the finger is configured to disengage the top edge of the first transparent window component and the press bar is configured to push against the front surface of the first transparent window component to connect at least a top portion of the first transparent window component to at least a top portion of the spacer frame to form a partially-mated IGU.

In other embodiments, the partially-mated IGU includes a gap between the bottom portion of the first transparent window component and a bottom portion of the spacer frame for receiving gas to form a gas-filled IGU.

In some embodiments, the conveyor assembly is configured to translate the second transparent window component and a third transparent window component to a second assembly position where the second and third transparent window components are substantially parallel to the table surface and behind the first transparent window component after the first transparent window component is extended to the first assembly position, wherein the second and third transparent window components have one or more spacer frames attached thereto.

In other embodiments, in response to the conveyor assembly translating the second and third transparent window components to the second assembly position, the press bar is configured to push against the front surface of the first transparent window component to connect at least a top portion of the first transparent window component to at least a top portion of one of the one or more spacer frames to obtain a partially-mated IGU.

In some embodiments, the partially-mated IGU includes a gap between the bottom portion of the first transparent window component and a bottom portion of the one of the one or more spacer frames for receiving gas to form a gas-filled IGU.

In other embodiments, the assembly table has a groove through the table surface, wherein the press bar includes a finger extending from the press bar towards the table surface, wherein the finger is configured to be received by the groove at the initial position of the first transparent window component, and wherein the finger is configured to engage a top edge of the first transparent window component and to support the back surface of the first transparent window component when the first transparent window component is offset from the table surface at the first assembly position.

In some embodiments, in response to the conveyor assembly translating the second and third transparent window components to the second assembly position, the finger is configured to disengage the top edge of the first transparent window component and the press bar is configured to push against the front surface of the first transparent window component to connect at least a top portion of the first transparent window component to at least a top portion of one of the one or more spacer frames to obtain a partially-mated IGU.

In other embodiments, the partially-mated IGU includes a gap between the bottom portion of the first transparent window component and a bottom portion of the one of the one or more spacer frames for receiving gas to form a gas-filled IGU.

A method of assembling an IGU is also presented. The method can include receiving first and second transparent window components at a table surface of an assembly station, the table surface being positioned at an incline relative to a vertical position. The method can include translating the first and second transparent window components along a translation pathway from a first end of the table surface to a second end of the table surface, the translation pathway being substantially parallel to the table surface. The method can include engaging the first transparent window component with a projection component. The method can include translating at least a bottom portion of the first transparent window component with the projection component between an initial position and a first assembly position offset from the translation pathway. The method can also include bringing the first transparent window component from the first assembly position into contact with the second transparent window component to form the IGU.

In some embodiments, engaging the first transparent window component and translating at least the bottom portion of the first transparent window component with the projection component further includes: receiving a bottom edge of the first transparent window component at a receiving surface defined between first and second edges of the projection component, and merging an extension surface of the projection component with the translation pathway upon extension of the projection component to the first assembly position.

In other embodiments, the method further includes engaging a press bar with a top portion of the first transparent window component, the press bar being configured to both push a front surface of the first transparent window component and support a back surface of the first transparent window component when the first transparent window component is offset from the table surface.

In some embodiments, the method further includes translating the second transparent window component to a second assembly position such that the second transparent window component is substantially parallel to the table surface and behind the first transparent window component after the first transparent window component is extended to the first assembly position, wherein the second transparent window component has a spacer frame attached thereto.

In other embodiments, the method further includes, in response to the conveyor assembly translating the second transparent window component to the second assembly position, pushing the press bar against the front surface of the first transparent window component to connect at least a top portion of the first transparent window component to at least a top portion of the spacer frame to form a partially-mated IGU.

In some embodiments, the partially-mated IGU includes a gap between the bottom portion of the first transparent window component and a bottom portion of the spacer frame for receiving gas to form a gas-filled IGU.

In other embodiments, the method further includes receiving a finger of the press bar in a groove through the table surface at the initial position of the first transparent window component, the finger being configured to engage a top edge of the first transparent window component and to support the back surface of the first transparent window component when the first transparent window component is offset from the table surface at the first assembly position.

In some embodiments, the method further includes, in response to the conveyor assembly translating the second transparent window component to the second assembly position, disengaging the finger from the top edge of the first transparent window component and pushing the press bar against the front surface of the first transparent window component to connect at least a top portion of the first transparent window component to at least top portion of the spacer frame to form a partially-mated IGU.

In other embodiments, the partially-mated IGU includes a gap between the bottom portion of the first transparent window component and a bottom portion of the spacer frame for receiving gas to form a gas-filled IGU.

In some embodiments, the method further includes translating the second transparent window component and a third transparent window component to a second assembly position where the second and third transparent window components are substantially parallel to the table surface and behind the first transparent window component after the first transparent window component is extended to the first assembly position, wherein the second and third transparent window components have one or more spacer frames attached thereto.

In other embodiments, the method further includes, in response to the conveyor assembly translating the second and third transparent window components to the second assembly position, pushing the press bar against the front surface of the first transparent window component to connect at least a top portion of the first transparent window component to at least a top portion of one of the one or more spacer frames to obtain a partially-mated IGU.

In some embodiments, the partially-mated IGU includes a gap between the bottom portion of the first transparent window component and a bottom portion of the one of the one or more spacer frames for receiving gas to form a gas-filled IGU.

In other embodiments, the method further includes receiving a finger of the press bar in a groove through the table surface at the initial position of the first transparent window component, the finger being configured to engage a top edge of the first transparent window component and to support the back surface of the first transparent window component when the first transparent window component is offset from the table surface at the first assembly position.

In some embodiments, the method further includes, in response to the conveyor assembly translating the second and third transparent window components to the second assembly position, disengaging the finger from the top edge of the first transparent window component pushing the press bar against the front surface of the first transparent window component to connect a top portion of the first transparent window component to a top portion of one of the one or more spacer frames to obtain a partially-mated IGU.

In some embodiments, the partially-mated IGU includes a gap between the bottom portion of the first transparent window component and a bottom portion of the one of the one or more spacer frames for receiving gas to form a gas-filled IGU.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The invention may be more completely understood and appreciated in consideration of the following detailed description of various embodiments of the invention in connection with the accompanying drawings.

Corresponding reference numerals indicate corresponding parts throughout the several views of the drawings.

DETAILED DESCRIPTION

Insulated glass unit (IGU) assembly systems involve arranging two or more transparent window components, e.g., panes of glass, spaced apart from each other. The transparent window components can be spaced apart from each other by inserting one or more spacers between the transparent window components. During assembly, IGU assembly systems typically utilize a vacuum system to remove a transparent window component off of a float table and place the transparent window component onto an assembly station. These vacuum systems require a large vacuum back plate that prevents an operator of the IGU assembly system from being able to see the process during operation. These vacuum systems are also complex, expensive, and slow. In some cases, the transparent window components can fall from the vacuum back plate and break.

Gas filling of the IGUs and/or pumping down the pressure in the IGUs to a near-vacuum pressure can be performed in various manners. One technique is to form a sealed IGU and then drill or otherwise form a temporary hole in the seal, the spacer, or one of the transparent window components to thereby to inject the gas, e.g., argon. This temporary hole can then be sealed. An alternative technique is to utilize special sealable conveyors to create a temporary seal with a gap or temporary hole in the IGU to thereby inject the gas, after which an actual or additional seal can be applied. The pressure in the IGUs can also be pumped down to near-vacuum using either of these techniques. Both of these techniques, however, are complex, slow, and require additional equipment, which increases costs.

Accordingly, a window unit assembly station and method are presented. The window unit assembly station and method of the present disclosure utilize mechanical components instead of a vacuum system during the actual assembly of an IGU. Compared to the vacuum system, these mechanical components are simpler, faster/cheaper, and allow the operator to see the process. These mechanical components also provide for only partially connecting the two or more transparent window components with the one or more spacers, e.g., at a top portion of the IGU, thereby leaving a gap, e.g., at the bottom, for gas filling in an enclosure.

Example embodiments will now be described more fully with reference to the accompanying drawings.

Figure 1:
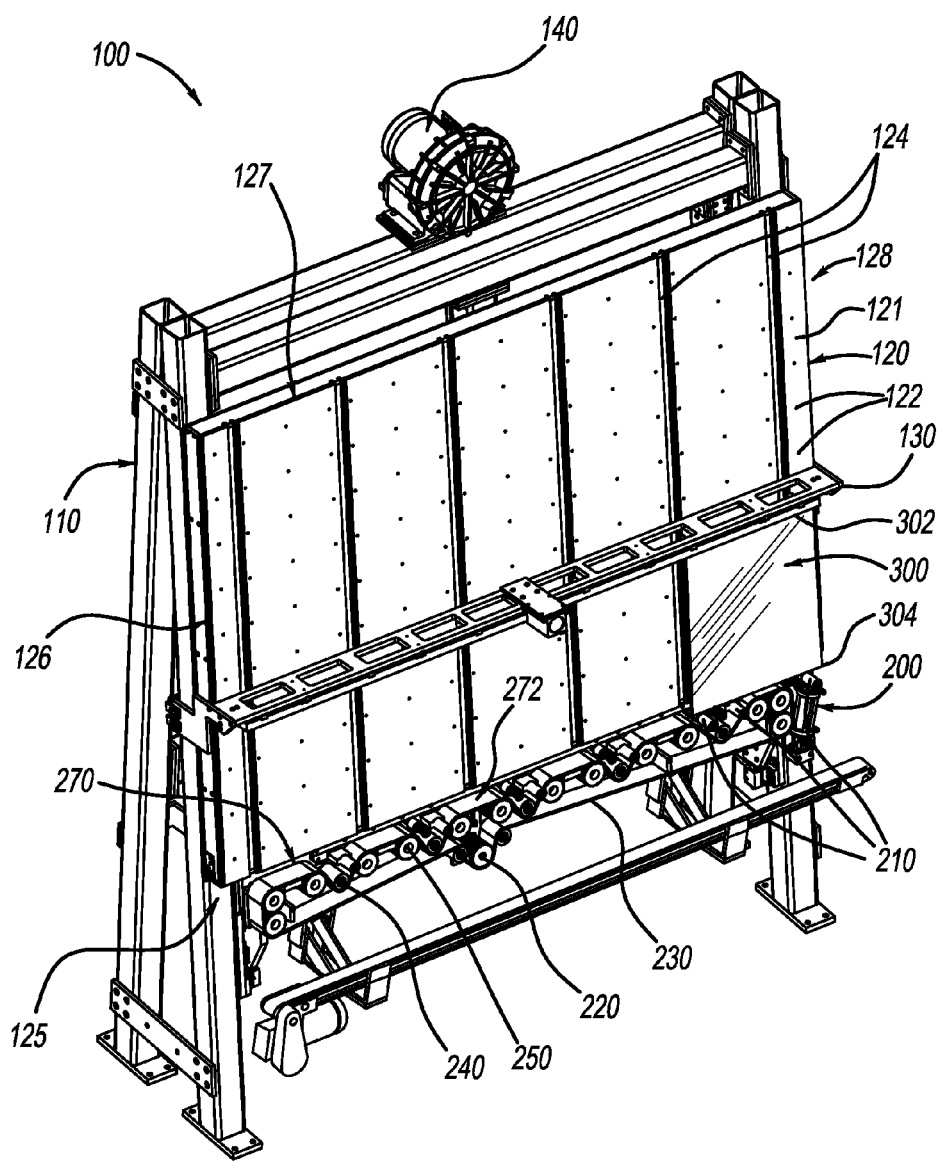
FIG. 1 depicts a perspective view of an assembly station consistent with the technology disclosed herein.
Figure 2:
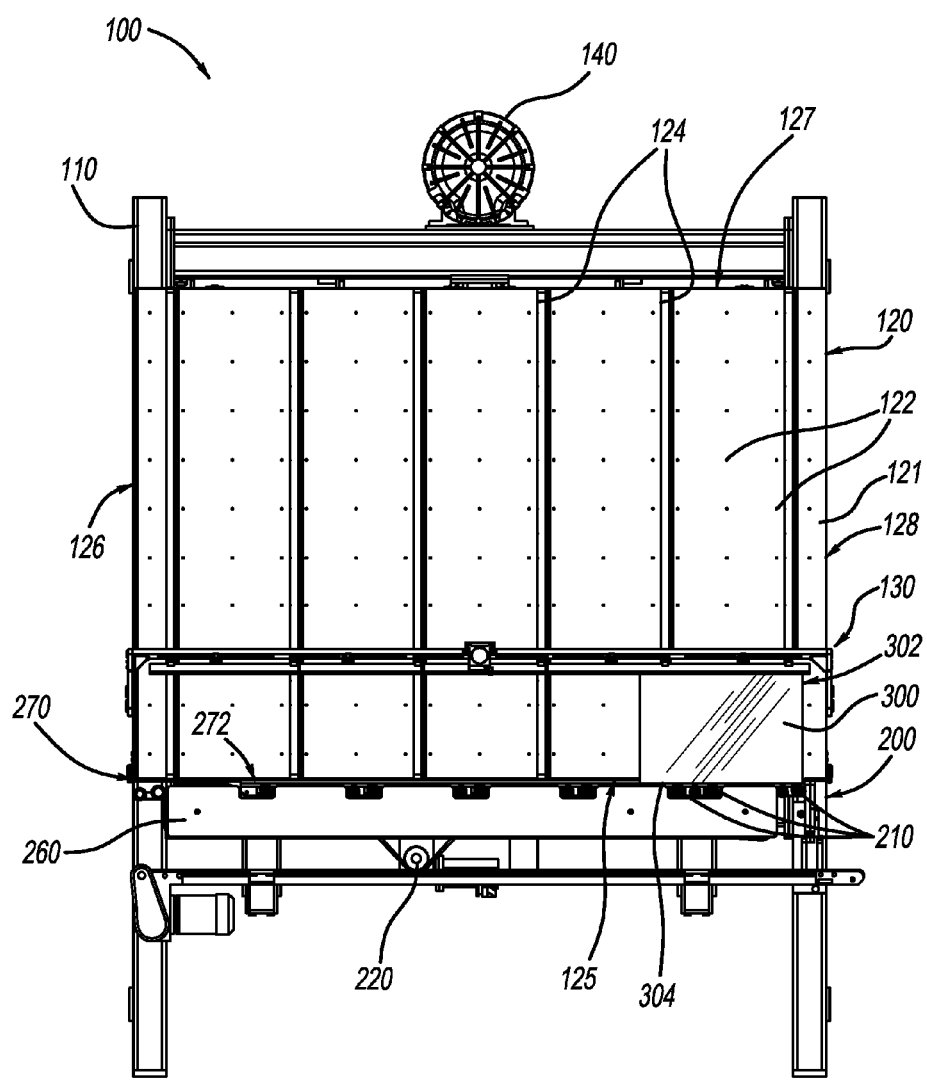
FIG. 2 depicts a front view of the assembly station consistent with FIG. 1.
Figure 3:
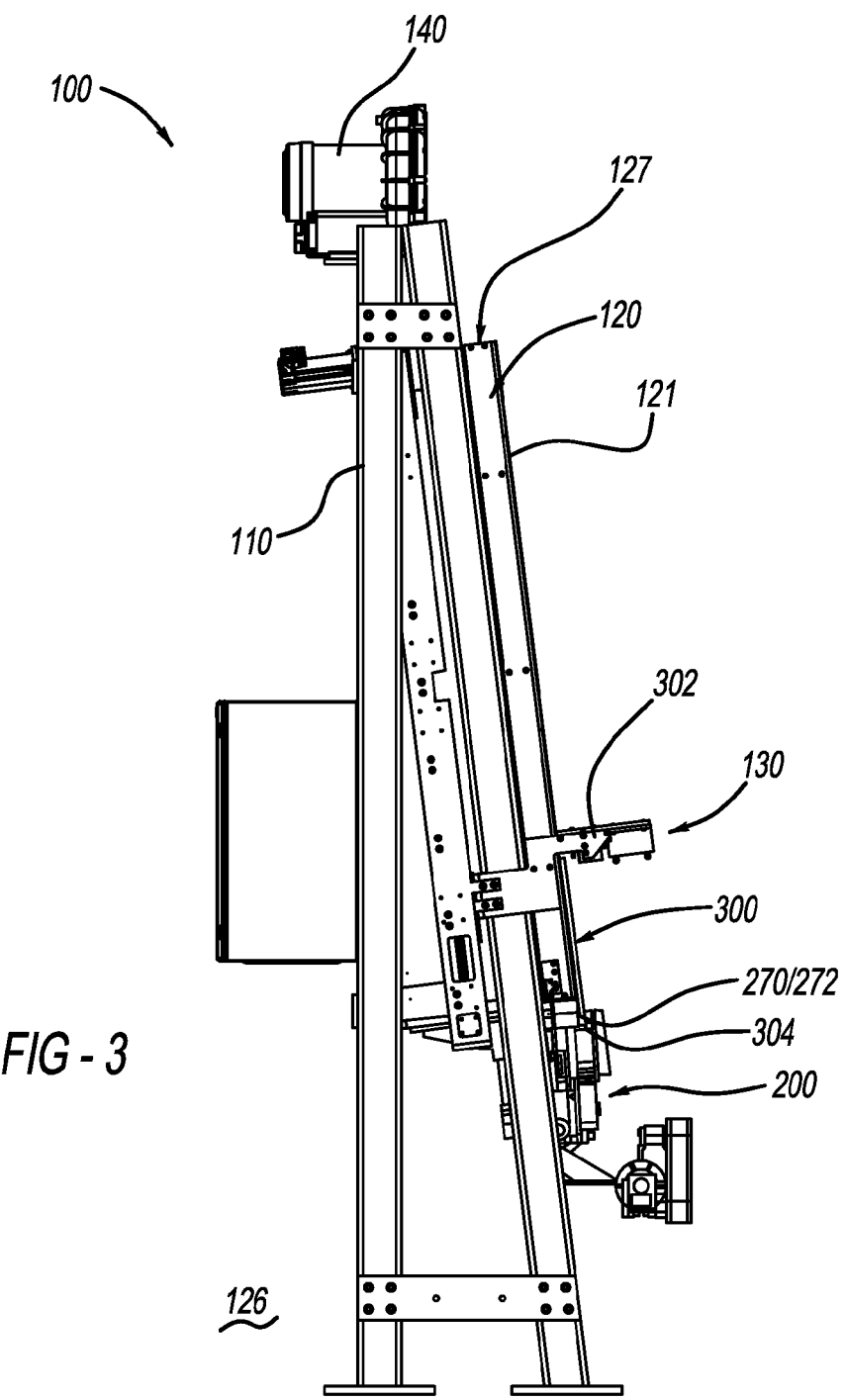
FIG. 3 depicts an end view of the assembly station consistent with FIG. 1.

FIG. 1 depicts a perspective view of an assembly station 100 consistent with the technology disclosed herein. The assembly station 100 has a frame 110, an assembly table 120, a press bar 130, a blower 140, and a conveyor assembly 200. The assembly station 100 is holding window unit components 300. The frame 110 is generally configured to allow the assembly station 100 to be free-standing. FIG. 2 depicts a front view of the assembly station of FIG. 1, where a conveyor housing 260 is disposed over portions of the conveyor assembly 200. FIG. 3 depicts the assembly station of FIG. 1 from a first end 126.

The assembly table 120 defines a table surface 121 configured to receive window unit components such as window panes, window pane assemblies, and the like. The table surface 121 is substantially planar. The table surface 121 is generally configured to be at a slight incline relative to a vertical position, such that gravity assists in keeping the window unit components 300 in position on the assembly table 120. In a variety of embodiments, the table surface is inclined relative to a vertical position by at least 1 degree, at least 2 degrees and at least 3 degrees. In one particular embodiment, the table surface is inclined relative to a vertical position by about 7 degrees.

The assembly table 120 defines a plurality of openings 122 through the assembly table 120 and the table surface 121 that allow passage of air to the table surface 121. The blower 140 provides pressurized air to pass through the plurality of openings 122 defined by the assembly table 120. As such, an air pathway is defined from the blower 140 to a pressurized air tank (not shown) through the plurality of openings 122 of the assembly table 120 such that the air tank, the blower 140, and the plurality of openings 122 are in fluid communication. Such a configuration reduces friction between the window unit components 300 and the table surface 121. The assembly table 120 also defines incremental grooves 124 extending from the top end 127 to the bottom end 125 of the assembly table 120 along the table surface 121, which will be described in more detail, below.

The press bar 130 extends substantially across the width of the assembly table 120. The press bar 130 is translatable parallel to the table surface 121 from the top end 127 to the bottom end 125 of the table surface 121. The press bar 130 is configured to align with a first edge 302 of the window unit components 300 and assemble the window unit components 300 together to form a window unit. In a variety of embodiments, the press bar 130 presses the window unit components 300 together along the first edge 302. The press bar 300 is also generally configured to translate a first window unit component from the table surface 121 of the assembly table 120 in a direction generally perpendicular to the table surface 121 of the assembly table 120, which will be described in more detail, below.

The conveyor assembly 200 is generally configured to linearly translate window unit components from the first end 126 of the assembly table towards a second end 128 of the assembly table 120 via a translation pathway 270. Components of the conveyor assembly 200 along the translation pathway 270 define a translation surface 272 that is configured to frictionally engage each of the window unit components 300 along portions of the surfaces of their bottom edges 304. The translation pathway 270 is defined by at least a conveyor belt 230 and, periodically, one or more projection components 210, where the projection components are slide rollers 210. In a variety of embodiments the translation pathway 270 is parallel to the table surface 121. The translation surface 272 is defined by at least portions of the conveyor belt 230 along the translation pathway 270. The conveyor assembly 200 generally has components including a drive roller 220, the conveyor belt 230, the slide rollers 210, and a combination of idler rollers 240 and/or idler gears 250 to translate the conveyor belt 230 and adjust tension of the conveyor belt 230. The conveyor assembly 200 is further configured to align a first window unit component and a second window unit component, which will be described in more detail, below.

Figure 4:
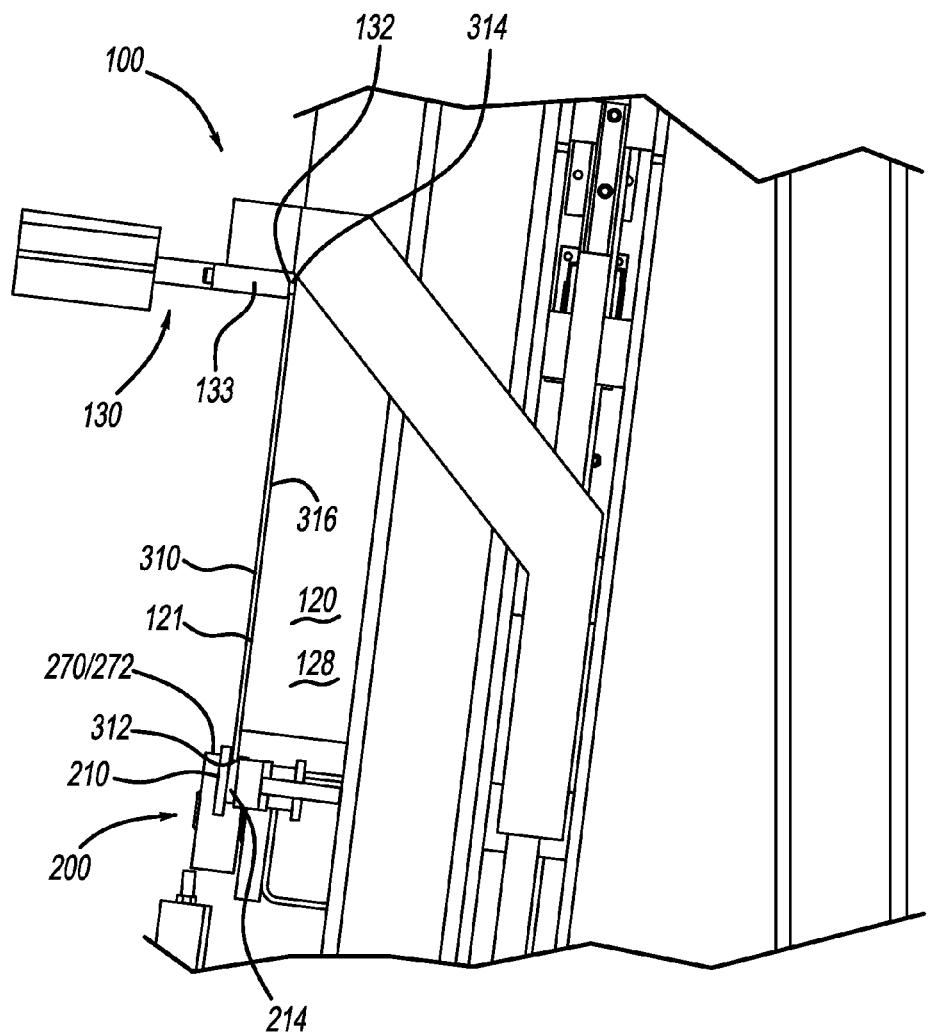
FIG. 4 is a schematic representation of a first step of a process, consistent with the technology disclosed herein.
Figure 5:
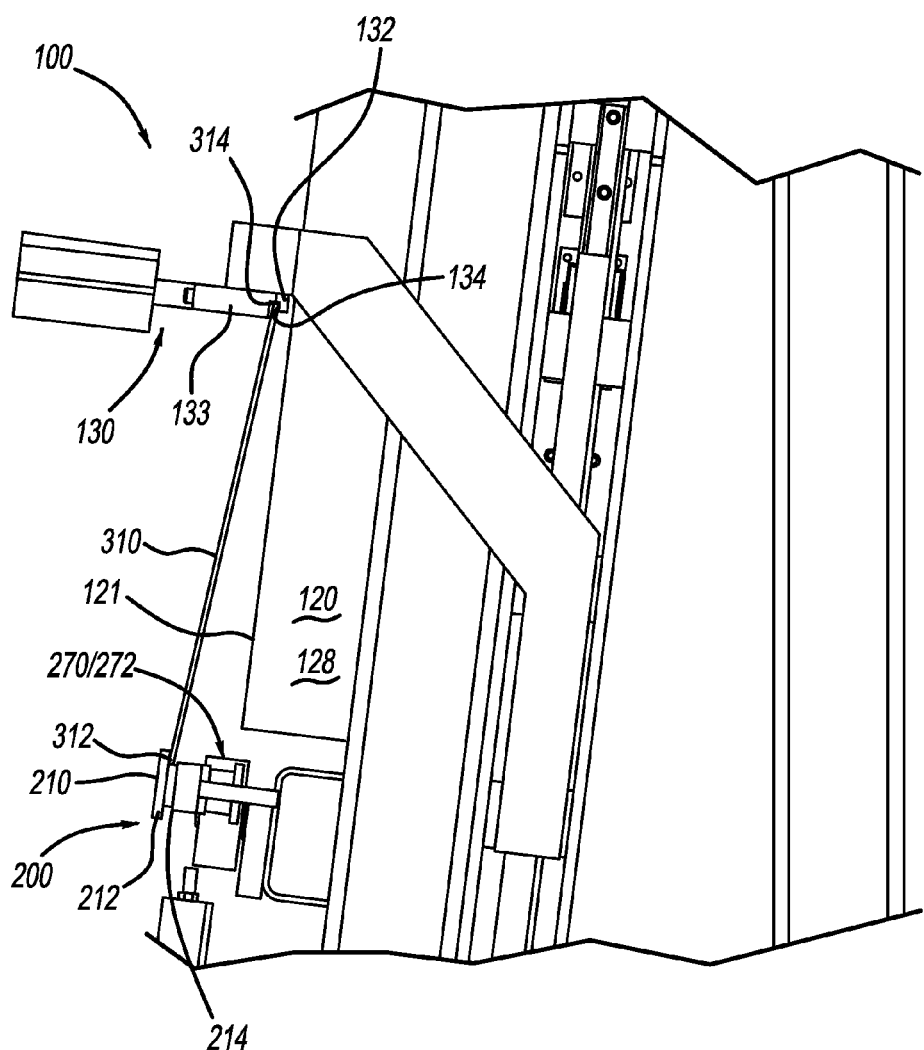
FIG. 5 is a schematic representation of a second step of a process, consistent with the technology disclosed herein.
Figure 6:
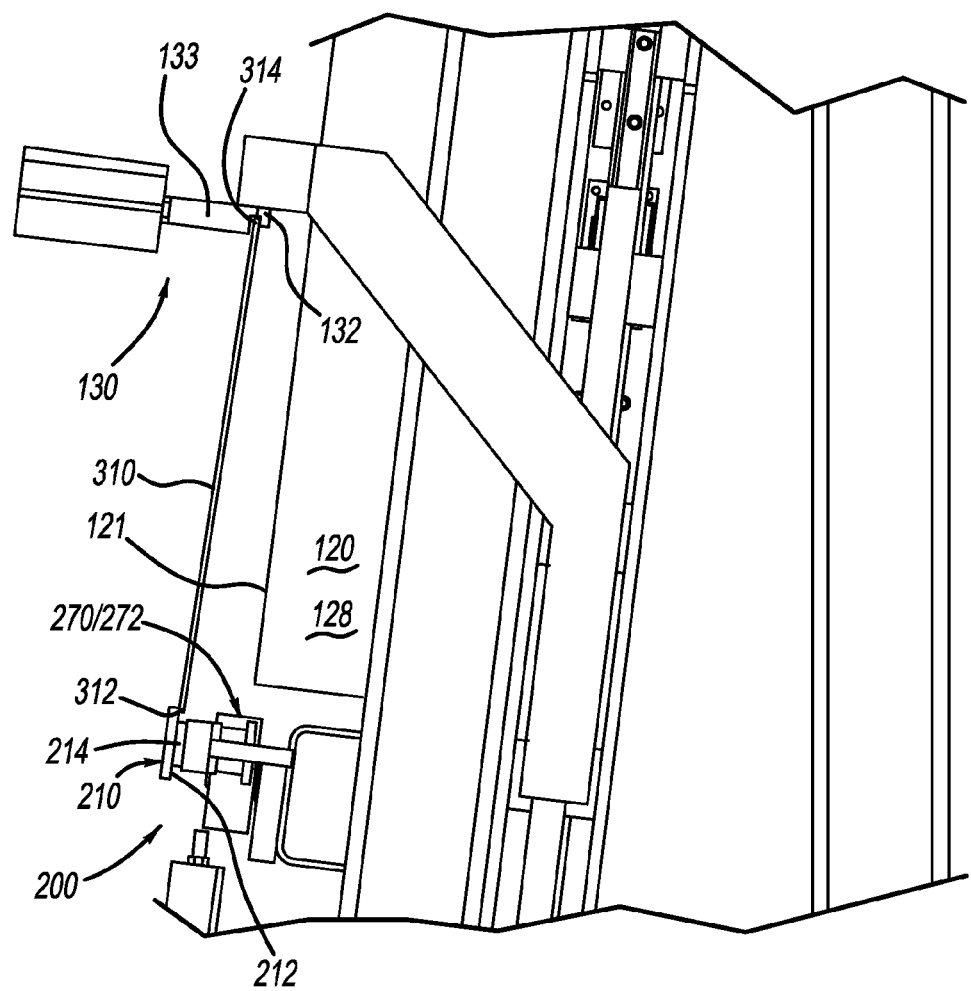
FIG. 6 is a schematic representation of a third step of a process, consistent with the technology disclosed herein.
Figure 7:
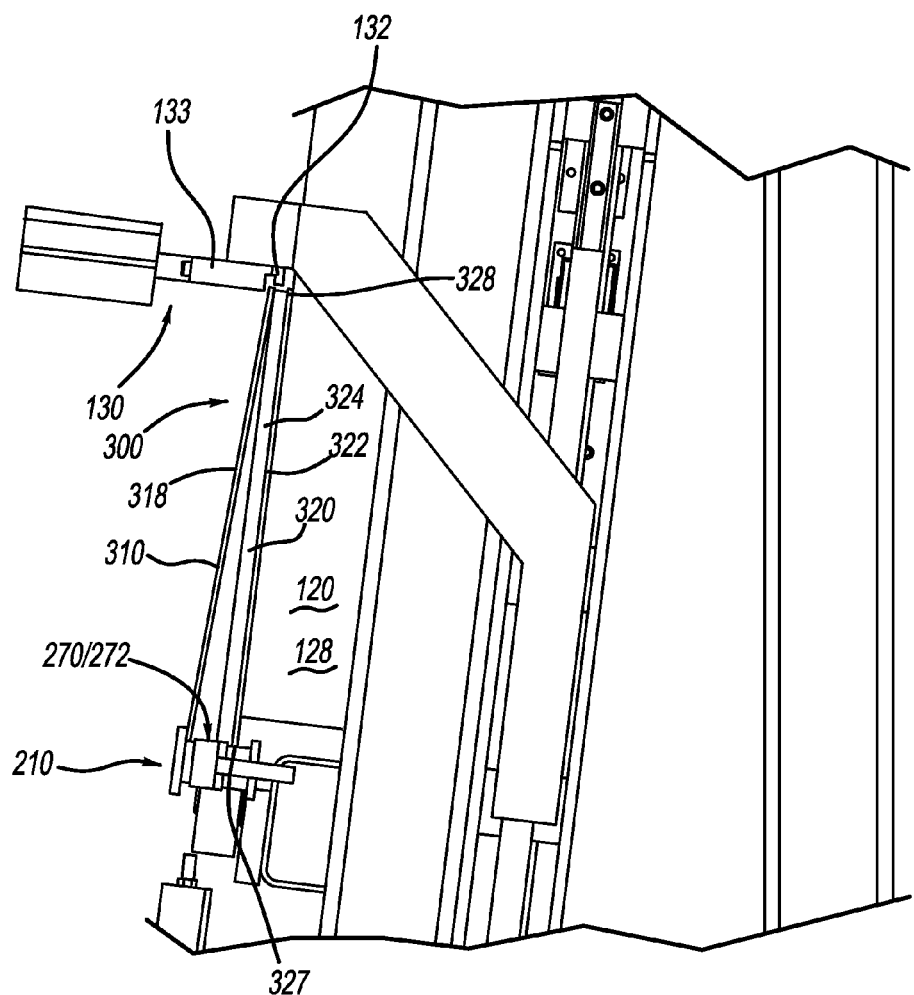
FIG. 7 is a schematic representation of a fourth step of a process, consistent with the technology disclosed herein.

FIGS. 4-7 are schematic representations of incremental process steps consistent with the technology disclosed herein as viewed from a second end 128 of the assembly station 100. FIG. 4 depicts a first window unit component 310 having been translated towards the second end 128 of the assembly table 120 along the assembly table surface 121 and a translation pathway 270 defined by the conveyor assembly 200. FIGS. 5-6 depict the translation of the first window unit component 310 in a direction substantially perpendicular to the table surface 121. FIG. 7 depicts a second window unit component 320 having been translated to be aligned with the first window unit component 310 to be assembled.

Turning now to FIG. 4, the first window unit component 310 has been received by the assembly station 100. In a variety of embodiments the first window unit component 310 is at least a window pane, and can include other components as well. In a variety of embodiments the first window unit component 310 is received by the assembly station 100 from a previous station in a manufacturing line. A portion of the bottom surface of the bottom edge 312 of the first window unit component 310 is frictionally engaged by at least a portion of the translation surface 272 along the translation pathway 270 on the first end 126 of the assembly station 100 (See FIG. 1), and the translation surface 272 is translated, thereby translating the window unit component 310 towards the second end 128 of the assembly station 100 to a position consistent with that represented in FIG. 2. The translation pathway 270 is partially defined by a portion of the outer annular receiving surface 214 of each of a plurality of slide rollers 210 disposed adjacent to the assembly table 121, so that the first window unit component is positioned on at least one slide roller. In a variety of embodiments the slide rollers 210 are idler rollers.

One or more fingers 132 (See FIG. 5 for an unobstructed view) of the press bar 130 translates along the table surface 121 from top to bottom of the table surface to a position clear of the top edge 314 of the window unit component 310. The fingers 132 translate towards the table surface 121 and each incremental finger 132 is received by an incremental groove 124 defined by the assembly table 120. The fingers 132 translate along the table surface 121 towards the top edge 314 of the window unit component 310 such that an inner surface 134 of the finger 132 sits adjacent to the back surface 316 of the window unit component 310 (See FIG. 5).

Generally, each of the fingers 132 has an extension component 133 that extends from the press bar 130 in a direction towards the table surface 121 and a contact component that extends generally parallel to the table surface 121. The contact component defines a contact surface that is the inner surface 134 of the finger 132. The extension component 133 and the contact surface 134 enable the finger 132 to receive an edge of a window unit component, including the surface of the first window unit component 310 that abuts the table surface 121.

Each of the incremental grooves 124 are generally sized to accommodate the width and depth of the corresponding finger 132 that will be received. Generally, each of the fingers 132 are similarly sized and, likewise, each of the grooves 124 are similarly sized. In one embodiment, the width of each groove is about 1-inch. In one embodiment, the depth of each groove is about ⅜-inches. Those having skill in the art will appreciate the variety of dimensions that can be used for these components.

Referring now to FIG. 5, the slide rollers 210 are extended from the translation pathway 270, and in a direction generally perpendicular to, the table surface 121. A first annular ridge 212 and a second annular ridge 216 prevent translation of the bottom edge 312 of the first window unit component 310 beyond the outer annular receiving surface 214 of each of the slide rollers 210. As such, when the slide rollers 210 extend from the translation pathway 270, the bottom edge 312 of the first window unit component 310 is likewise translated away from the translation pathway 270.

While in the embodiments disclosed herein slide rollers are disclosed, those having skill in the art will appreciate that other structures can be used that are positioned to mutually define the translation pathway, receive a surface of a first window unit component, and extend to a position outside of the translation pathway. Such components are broadly referred to herein as projection components. In one alternative embodiment, for example, each of one or more projection components defines a stationary receiving surface rather than an annular, rotatable receiving surface of a slide roller. In such an embodiment, the stationary receiving surface can be configured to create relatively low friction forces to allow translation of window components thereon. Ridges can similarly abut the receiving surface of such a projection component to prevent translation of a window unit component beyond that receiving surface. Projection components can have other configurations, as well.

Referring back to FIG. 5, in a variety of embodiments, prior to extension of the slide rollers 210, the translation surface 272 defined by the conveyor assembly 200 is temporarily removed from the translation pathway 270 to prevent interference between the translation surface 272 and the first window unit component 310 during extension of the slide rollers 210. In one such embodiment, portions of the conveyor assembly 200 and/or the translation surface 272 are pivotably coupled to the assembly station frame 110 or the assembly table 120 such that the translation surface 272 of the conveyor assembly 200 is pivoted out of the translation pathway 270 before extension of the slide rollers 210, and pivoted back to the translation pathway 270 following extension of the slide rollers 210. Other mechanisms to temporarily remove the translation surface 272 from the translation pathway 270 will also be appreciated by those having skill in the art.

Figure 9:
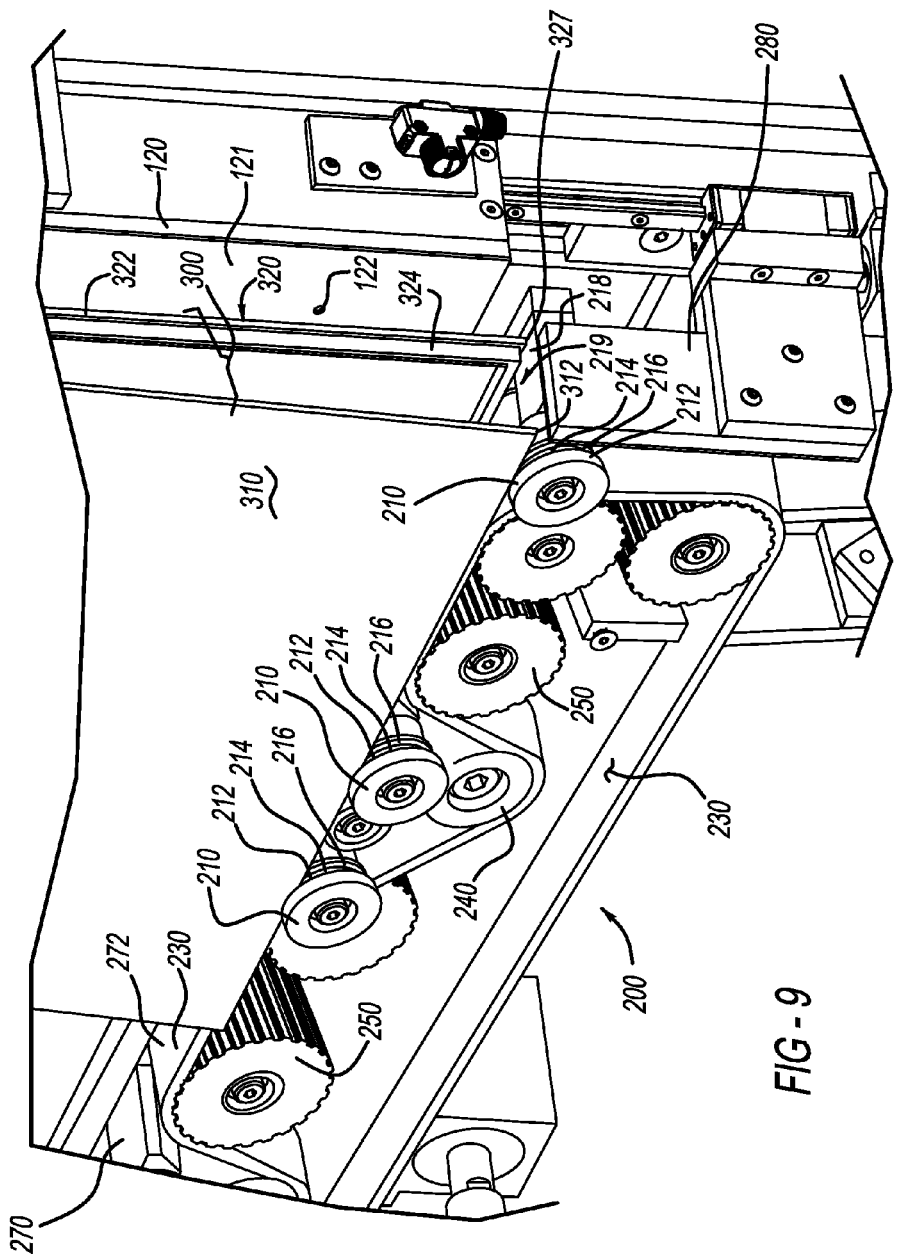
FIG. 9 is a detail view of a portion of an assembly station having received window unit components consistent with the technology disclosed herein.

In substantial unison with extension of the slide rollers 210, the fingers 132 are translated away from the table surface 121, which translates the top edge 314 of the first window unit component 310 away from the table surface 121. FIG. 6 depicts the first window unit component 310 in an assembly position between the slide rollers 210 and the fingers 132. With the first window unit component 310 in the assembly position and cleared from the translation pathway 270, the second window unit component 320 can be translated along the table surface 121 and the translation pathway 270 to the assembly position. The assembly position for the second window unit component 320 is depicted in FIGS. 7 and 9. The "assembly position" is defined herein as the position of the applicable window unit components immediately prior to bringing the window unit components into contact.

A portion of the bottom surface of the bottom edge 327 of the second window unit component 320 is frictionally engaged by the translation surface 272 defined by conveyor assembly 200 components along the translation pathway 270, and the second window unit component 320 is translated to an assembly position such as that depicted in FIG. 7. In a variety of embodiments the second window unit component 320 is received by the assembly station 100 from a previous station in a manufacturing line. The slide rollers 210 are no longer disposed along the translation pathway 270, which allows linear translation of the second window unit component 320 from the first end 126 (See FIG. 1) to the second end 128 of the assembly station 100 along the linear translation pathway defined by the remainder of the translation surface 272 of the conveyor assembly.

In the current embodiment, the second window unit component 320 is a second window pane 322 having a window spacer 324 coupled thereto. In some embodiments, the second window unit component can be multiple window panes coupled to one or more window spacers. The second window unit component is generally configured to be assembled with the first window unit component. In the current example, the window spacer 324 has an exposed edge 326 on which sealant is disposed. The exposed edge 326 of the window spacer 324 is configured to receive the first window unit component 310.

When the second window unit component 320 is in the assembly position, the top edge 314 of the first window unit component 310 is released by the fingers 132 to be substantially aligned with the top edge 328 of the second window unit component 320, particularly, the top edge 328 of the second window pane 322. In a variety of embodiments, prior to releasing the top edge 314 of the first window unit component 310, the fingers 132 and/or the slide rollers 210 can be translated towards the second window unit component 320 to better align the first window unit component 310 and the second window unit component 320. In some embodiments, the slide rollers 210 are retracted towards the table surface and, therefore, the second window unit component 320, to bring the first window unit component 310 in contact with the second window unit component 320. FIG. 7 shows the fingers 132 after releasing the first window unit component 310 to be in contact with the second window unit component 320.

In a variety of embodiments, after the top edge 314 of the first window unit component 310 is released, the push bar 130 makes contact with the front surface 318 of the first window unit component 310 towards the top edge 314 and compresses the first window unit component 310 against the sealant on the exposed edge 326 of the window spacer 324 to couple the window unit components 310, 320. In a variety of embodiments, the push bar 130 compresses the first window unit component 310 and the second window unit component 320 against the table surface 121 to a predetermined width.

Figure 8:
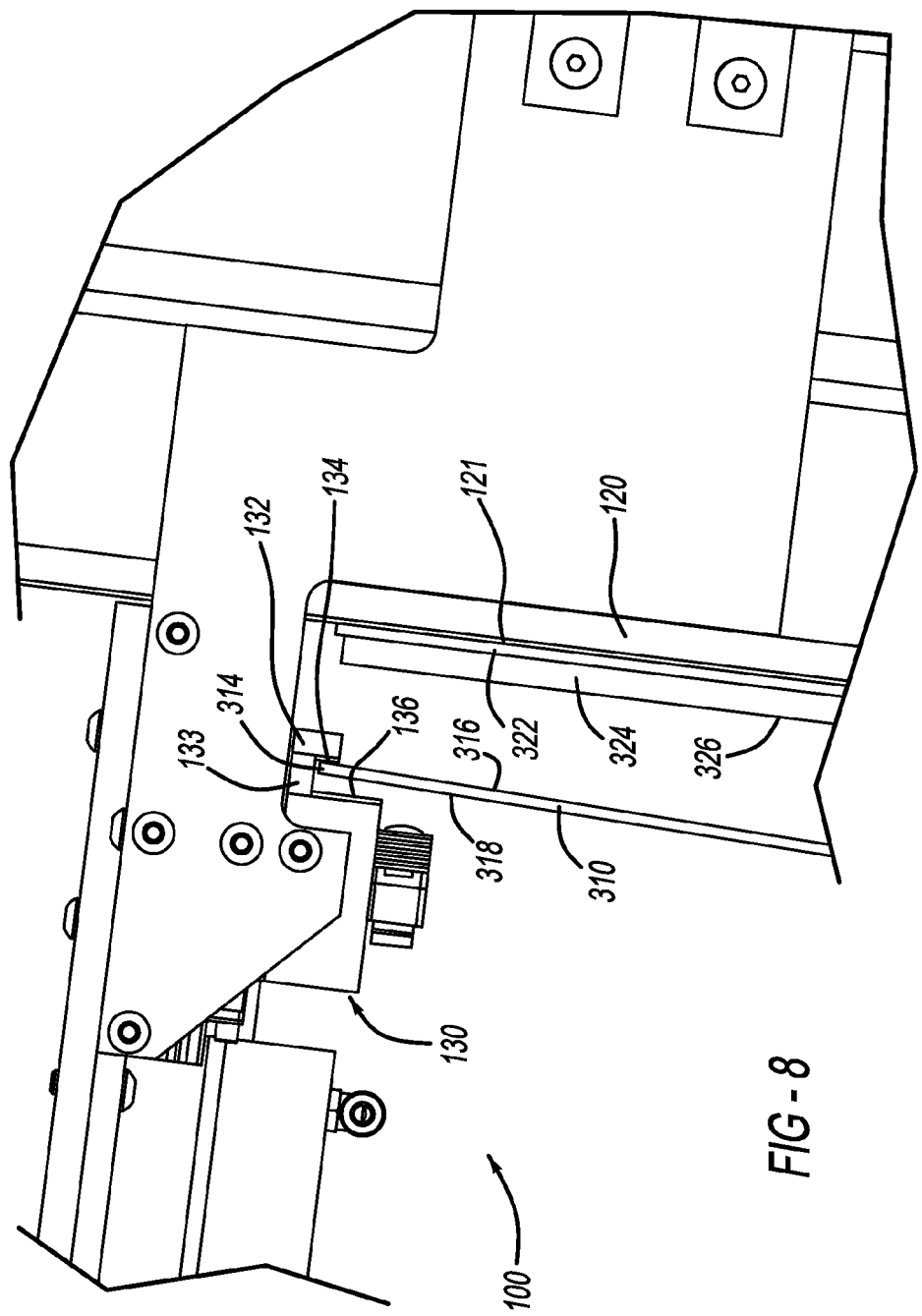
FIG. 8 is a detail end view during operation of an assembly station consistent with the technology disclosed herein.

FIG. 8 depicts a detail end view of a push bar 130 having fingers 132 that are engaging the top edge 314 of a first window unit component 310, consistent with embodiments of an assembly station 100. In FIG. 8, both of the first and second window unit components are in the assembly position, about to be brought into contact with each other. In the current embodiment, the inner surface of each of the fingers 132 defines a contact surface 134, which is configured to make contact with a portion of the back surface 316 of the first window unit component 310. The contact surface 134 is generally configured to limit scratching or other marking on the first window unit component 310. Likewise, the push bar 130 defines a push surface 136 that is configured to make contact with the front surface 318 of the first window unit component 310, and is similarly configured to limit scratching or other marking on the first window unit component 310. The push surface 136 extends far enough below the fingers 132 so that the push surface 136 can contact the front surface 318 while the fingers are clear of the top edge 314.

Upon coupling the top edge 314 of the first window unit component 310 with the second window unit component 320, the window unit 300 can be translated to another manufacturing station. In one embodiment, the window unit 300 is translated to a gas-filling station, where the space defined between the first window unit component 310 and the second window unit component 320 is filled with a gas. The window unit 300 can also be translated to other manufacturing stations, as well. In one embodiment, the partially-mated first window unit component 310 and the second window unit component 320 can be translated to a gas-filling station that includes an enclosure. The enclosure can fully enclose the partially-mated first window unit component and the second window unit component 320. Gas-filling can then occur, after which the first window unit component 310 can be fully-mated with the second window unit component 320 and sealed, thereby creating a sealed gas-filled IGU. In one embodiment, the enclosure can be pumped down to near-vacuum prior to or during the gas filling.

FIG. 9 is a detail view of a portion of an assembly station 100 having received window unit components 300 consistent with the technology disclosed herein. The assembly station 100 has at least an assembly table 120 and a conveyor assembly 200, both of which are partially viewable. The window unit components 300 are defined by a first component 310 and a second component 320 where, in the current embodiment, the first component 310 is a first window pane and the second component 320 is a second window pane 322 having a window spacer 324 coupled thereto.

A translation surface 272 along the translation pathway 270 is in contact with at least a portion of the surface of the bottom edge 327 of the second window unit component 320. Each of the plurality of slide rollers 210 defines an outer annular receiving surface 214 that is in contact with a portion of the surface of the bottom edge 312 of the first window unit component 310. In the current FIG. 9, the outer annular receiving surfaces 214 of the slide rollers 210 have been translated outwardly generally perpendicularly from the table surface 121 so that the outer annular receiving surfaces 214 lie outside the translation pathway 270.

In the current embodiment, the first window component 310 and the second window component 320 are aligned via the use of a mechanical stop gate 280 that is linearly translatable up and down to selectively physically obstruct the translation pathway 270. In use, the mechanical stop gate 280 can be positioned to obstruct the translation pathway 270 during translation of the first window unit component 310 and the second window unit component 320 such that both the first and second window unit components 310, 320 are eventually aligned with the mechanical stop gate 280. The stop gate 280 could also be linearly translatable in other directions, as well. Those having skill in the art will appreciate that other approaches to aligning the window components can also be used.

In the current embodiment, each of the slide rollers 210 has an extension portion 219 that defines a secondary support surface 218 that merges with the translation pathway 270 upon extension of the slide rollers 210. In such an embodiment portions of the extension surface 218 support the second window unit component 320 along the surface of the bottom edge 327 when the slide rollers 210 are in the extended position. In some other embodiments, an extension portion associated with a slide roller 210 does not selectively define the translation pathway 270.

Figure 10:
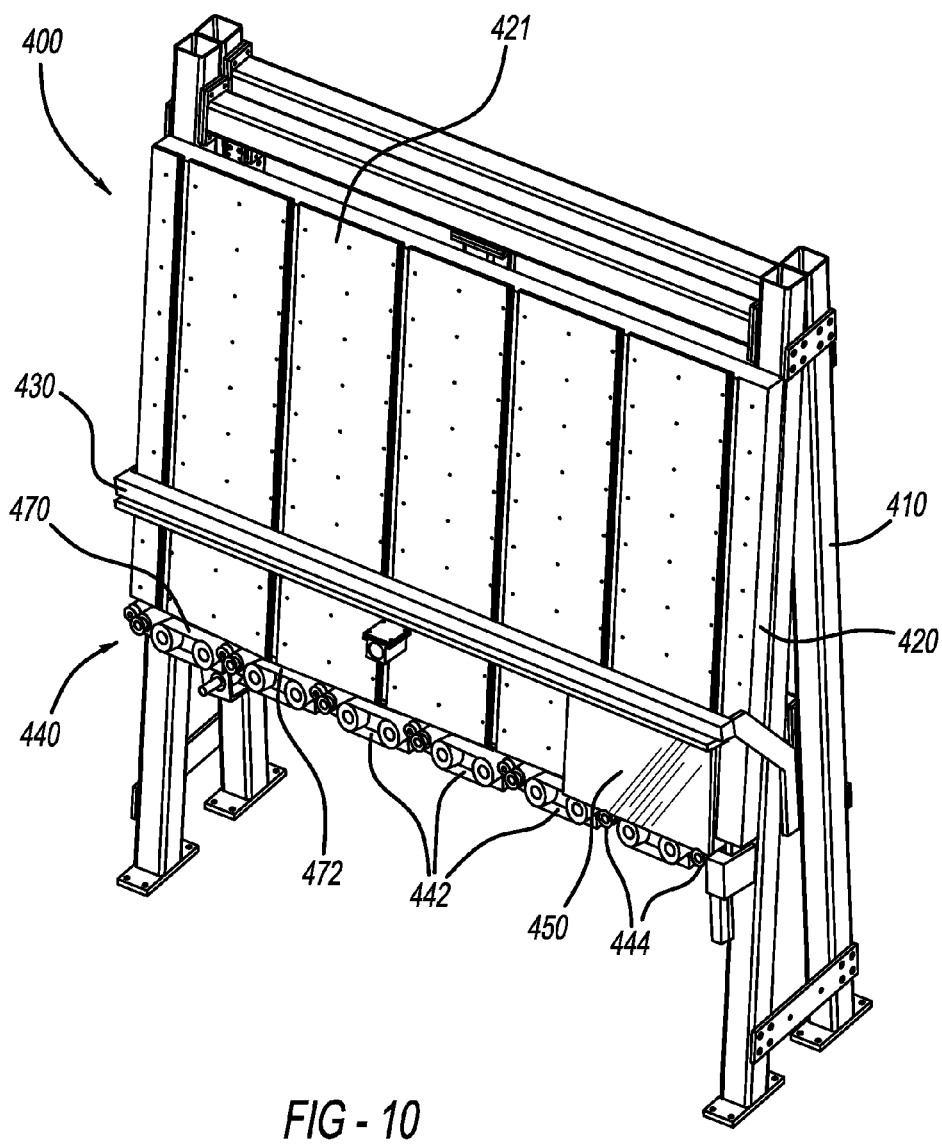
FIG. 10 is a perspective view of another embodiment of an assembly station consistent with the technology disclosed herein.
Figure 11:
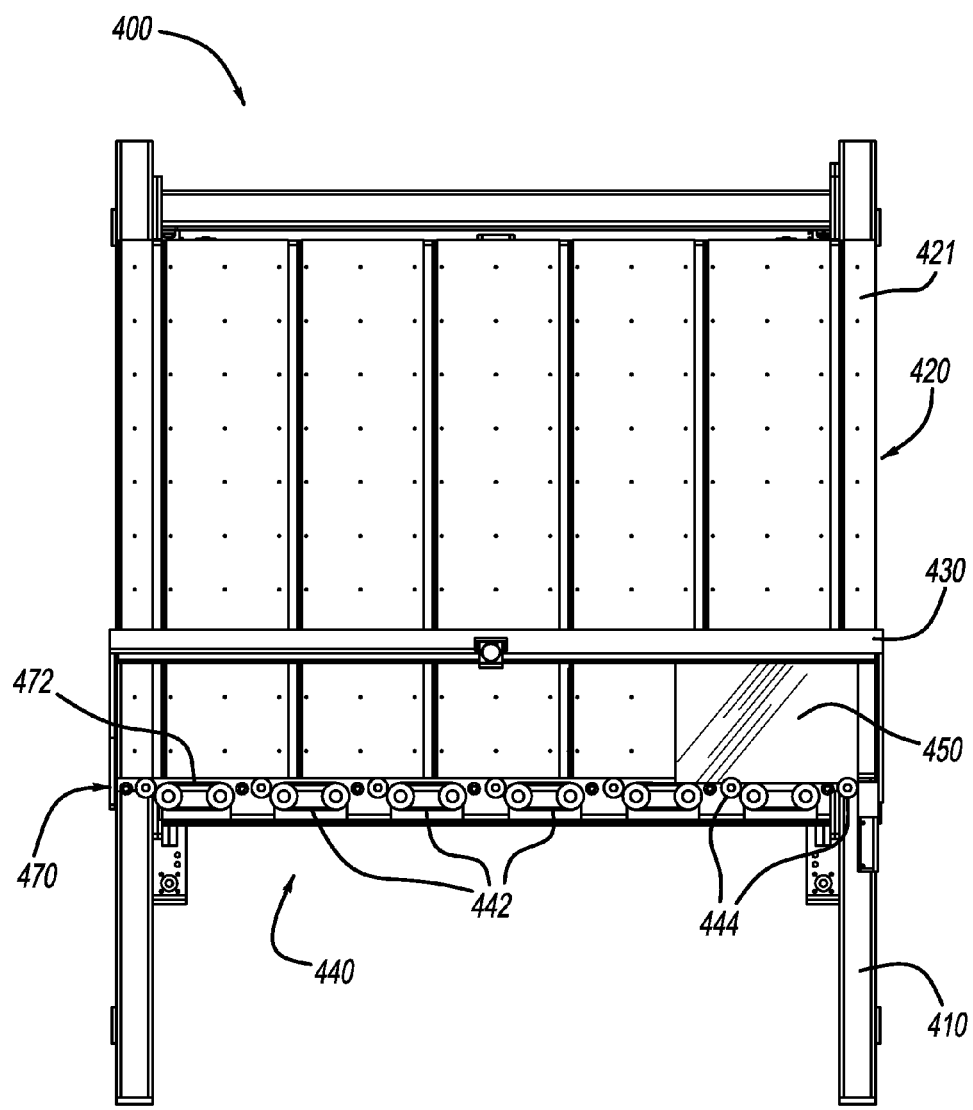
FIG. 11 is a front view of the embodiment depicted in FIG. 10.

FIG. 10 depicts a perspective view of another embodiment of an assembly station 400 consistent with the technology disclosed herein, and FIG. 11 depicts a front view of the system of FIG. 10. The assembly station 400 has a frame 410, an assembly table 420 defining a table surface 421, a press bar 430, and a conveyor assembly 440. The assembly station 400 is holding window unit components 450. This embodiment is generally similar to the embodiments previously depicted, except for, in particular, the configuration of the conveyor assembly 440. This particular embodiment lacks the drive roller coupled to a single conveyor belt depicted in FIG. 1, and the conveyor assembly 440 has a series of alternating conveyor belt segments 442 and slide rollers 444, where the conveyor belt segments 442 and the annular receiving surfaces of the slide rollers 444 mutually define a translation pathway 470 for a first window unit component. In such an embodiment multiple driving mechanisms can be used, or a single driving mechanism as will be understood in the art. Similar to the embodiments depicted previously, the slide rollers are configured to translate outward, substantially perpendicularly from the table surface 421 to remove the slide rollers 444 from intersecting with the translation pathway 470.

As previously discussed, in some prior art systems vacuum devices are used to lift and hold window panes and bring them into contact with other window components. However vacuum devices that contact one of the major surfaces of the pane also have the potential to leave a mark on the pane. In the embodiments of the assembly stations described herein, it is possible to manipulate window panes and window subassemblies to build window units without using a vacuum device, by using the structures described herein.

Figure 12:
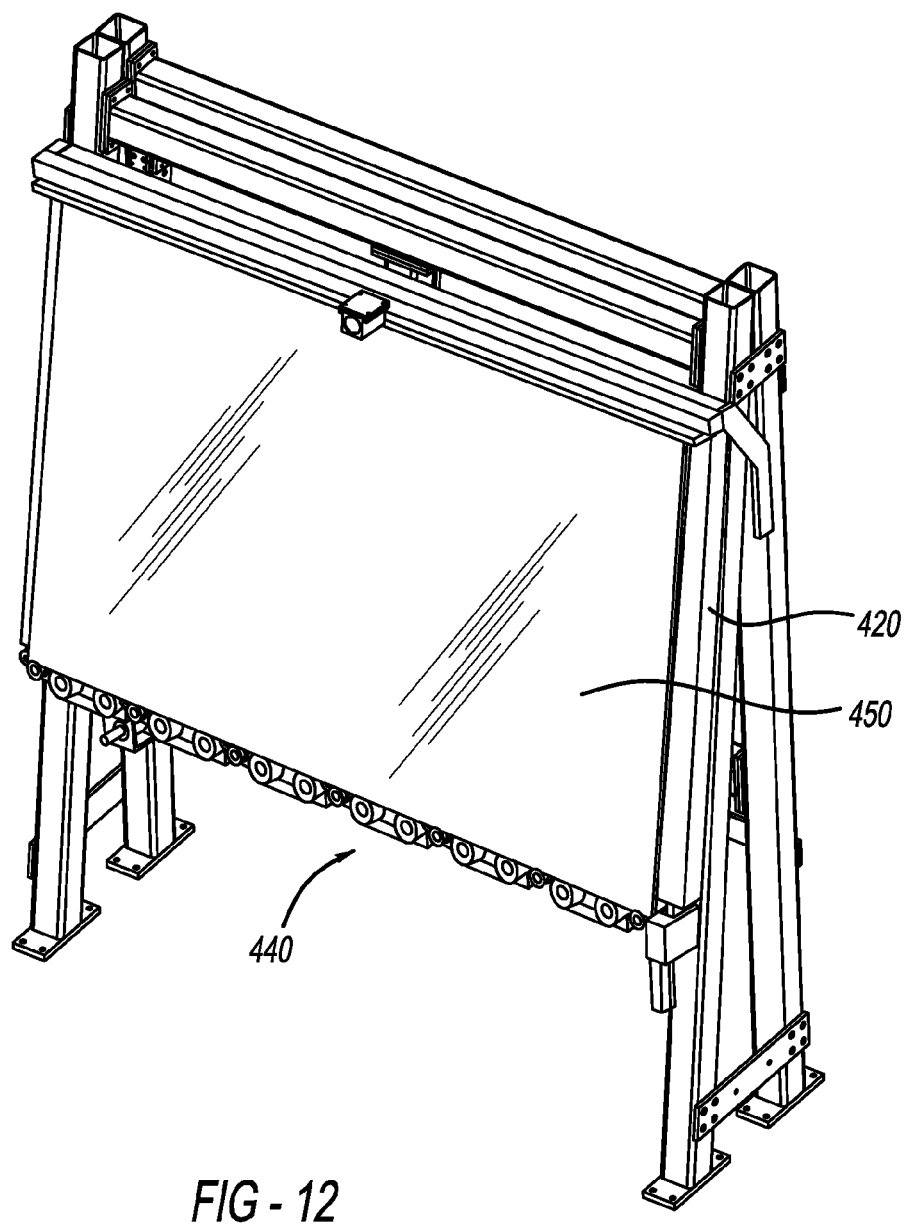
FIG. 12 is a view of the embodiment depicted in FIG. 10, having maximally-sized window unit components.

FIG. 12 depicts an assembly station 400 consistent with the embodiment depicted in FIGS. 10-11. In FIG. 12, the window unit components 450 are the maximum size accommodated by the assembly station 400. As such, the window unit components 450 extend across the width and the height of the table surface 421 of the assembly table 420.

Assembly stations consistent with the technology disclosed herein are compatible with window unit components having a wide range of sizes. Generally, the surface area of the table surface of the assembly table can define an upper limit to the size of the window components. In one embodiment the maximum window size that can be accommodated is 82 inches by 60 inches. It should be appreciated that other window sizes can be accommodated. The spacing of the slide rollers can help define a lower limit of the size of the window components that can be accommodated so that adequate support is provided to the window unit components. Also, the spacing of the components in the conveyor assembly can also help define a lower limit to the size of the accommodated window components. Furthermore, spacing of the incremental grooves and corresponding press bar fingers can also help define a lower limit to the size of the accommodated window components. Other factors can also limit the sizes of the window components that are accommodated, including the material properties of the window components such as structural rigidity, although structural supports incorporated in the current design could help alleviate those limitations. In one embodiment, the window unit assembly station consistent with the technology disclosed herein can accommodate components for a window unit as small as 14×14 inches.

Figure 13:
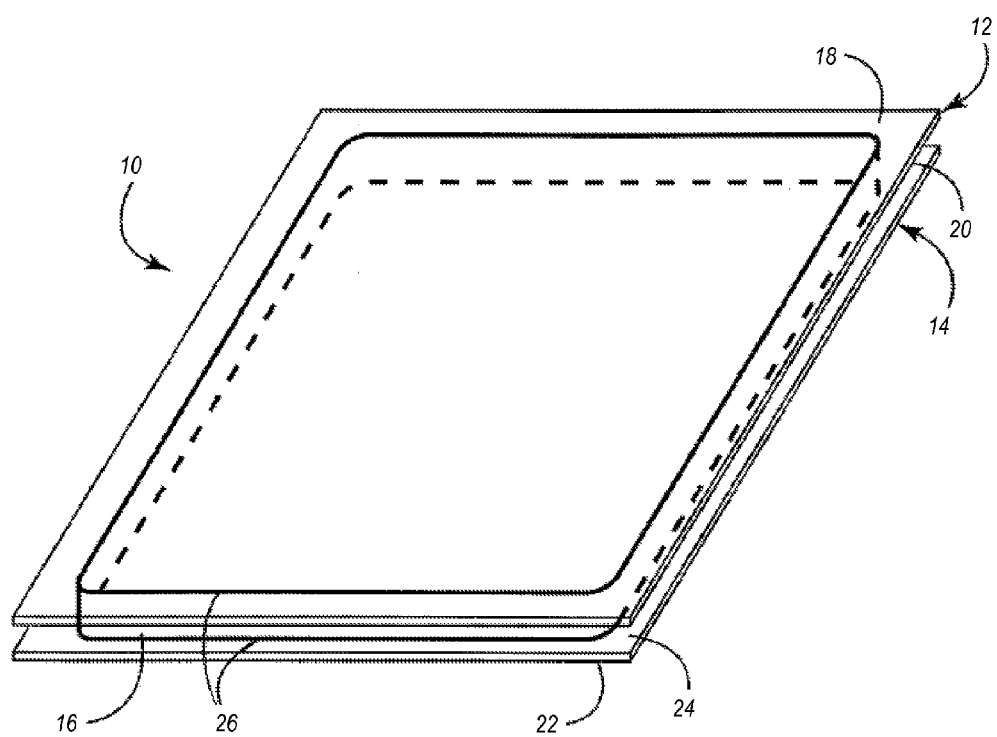
FIG. 13 depicts a schematic of an example window unit consistent with the technology disclosed herein.
Figure 14:
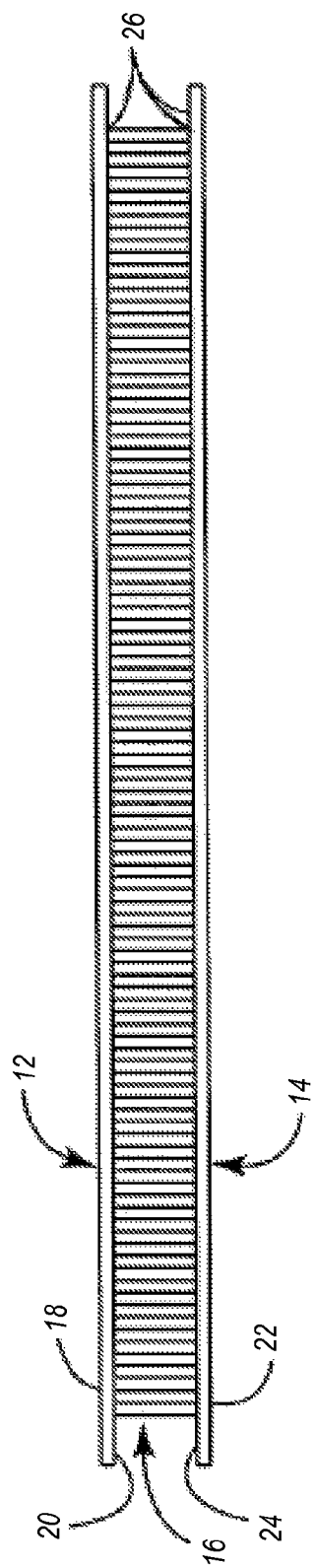
FIG. 14 depicts a schematic side view of the example window unit of FIG. 13.

FIGS. 13 and 14 are schematics of an example window unit consistent with the technology disclosed herein. The window unit 10 has a first window pane 12, a second window pane 14 and a spacer 16 disposed between the first and second window panes 12, 14. The first and second window panes 12, 14 are adapted to allow at least some light to pass through the window panes 12, 14. The first and second window panes 12, 14 are made of a translucent or transparent material. In at least one embodiment, the first and second window panes 12, 14 are made of a glass material. In another embodiment, the first and second window panes 12, 14 are made of a plastic material. In yet another embodiment, the first window pane 12 is a different material than the second window pane 14.

The first window pane 12 has a first surface 18 and an oppositely disposed second surface 20. The second window pane 14 likewise has a first surface 22 and an oppositely disposed second surface 24. The spacer 16 is disposed between the first and second window panes 12, 14 to keep the first and second window panes 12, 14 spaced apart from each other. The spacer 16 is generally adapted to withstand compressive forces applied to the first and second window panes 12, 14 and/or to maintain a desired space between the first and second window panes 12, 14.

The spacer 16 is sealingly engaged to each of the first and second window panes 12, 14 at an edge portion 26 of each of the first and second window panes 12, 14. In the depicted embodiment, the spacer 16 is sealingly engaged to the second surface 20 of the first window pane 12 and the second surface 24 of the second window pane 14.

While the example window unit herein has a first window unit component disclosed as a window pane and a second window unit component disclosed as a window pane and spacer assembly, such as in the discussions associated with FIGS. 4-9, those having skill in the art will appreciate that each window unit component can have a variety of configurations. The first window unit component is generally configured to be assembled with the second window unit component. As an example, in window units having three or more window panes and one or more spacers, the first window unit component can be a window pane and the second window unit component can be an assembly of multiple window panes having one or more spacers coupled thereto, where the first window unit component and the second window unit component are configured to be assembled. In yet another example, the first window unit component can be a window pane having a spacer, and the second window unit component can be a window pane.

Some assembly stations contemplated that are consistent with the technology disclosed herein can be used with window units having three or more window unit components and one or more spacers. For example, after a first window unit component and a second window unit component are assembled, the assembly can be translated to a position outside of the linear translation pathway, at which point a third window unit component can be translated along the linear translation pathway to an assembly position. The assembly can then be brought into contact with the third window unit component in accordance with concepts already described herein.

In some such embodiments having three or more window unit components, the assembly station disclosed herein can have secondary and even tertiary grooves corresponding secondary and even tertiary fingers to selectively engage additional window unit components. Those embodiments can additionally have secondary and even tertiary slide rollers initially disposed along the translation pathway, which are configured to extend to varying distances to properly align the window unit components for assembly. Those having skill in the art will appreciate these variances.

Figure 15:
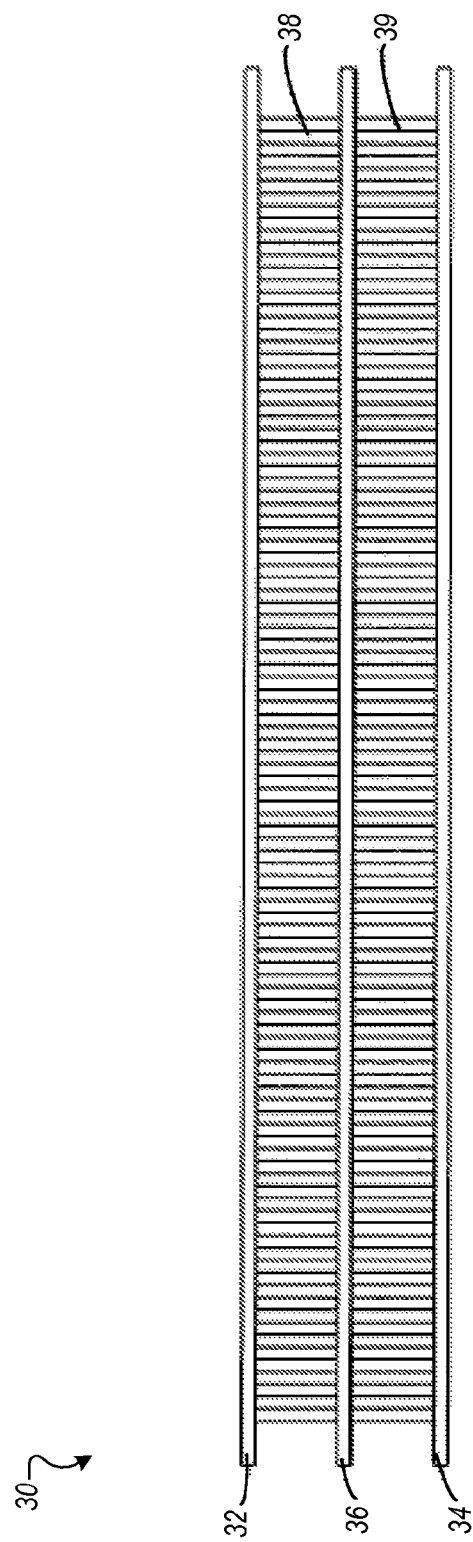
FIG. 15 depicts a schematic side view of another example window unit consistent with the technology disclosed herein.
Figure 16:
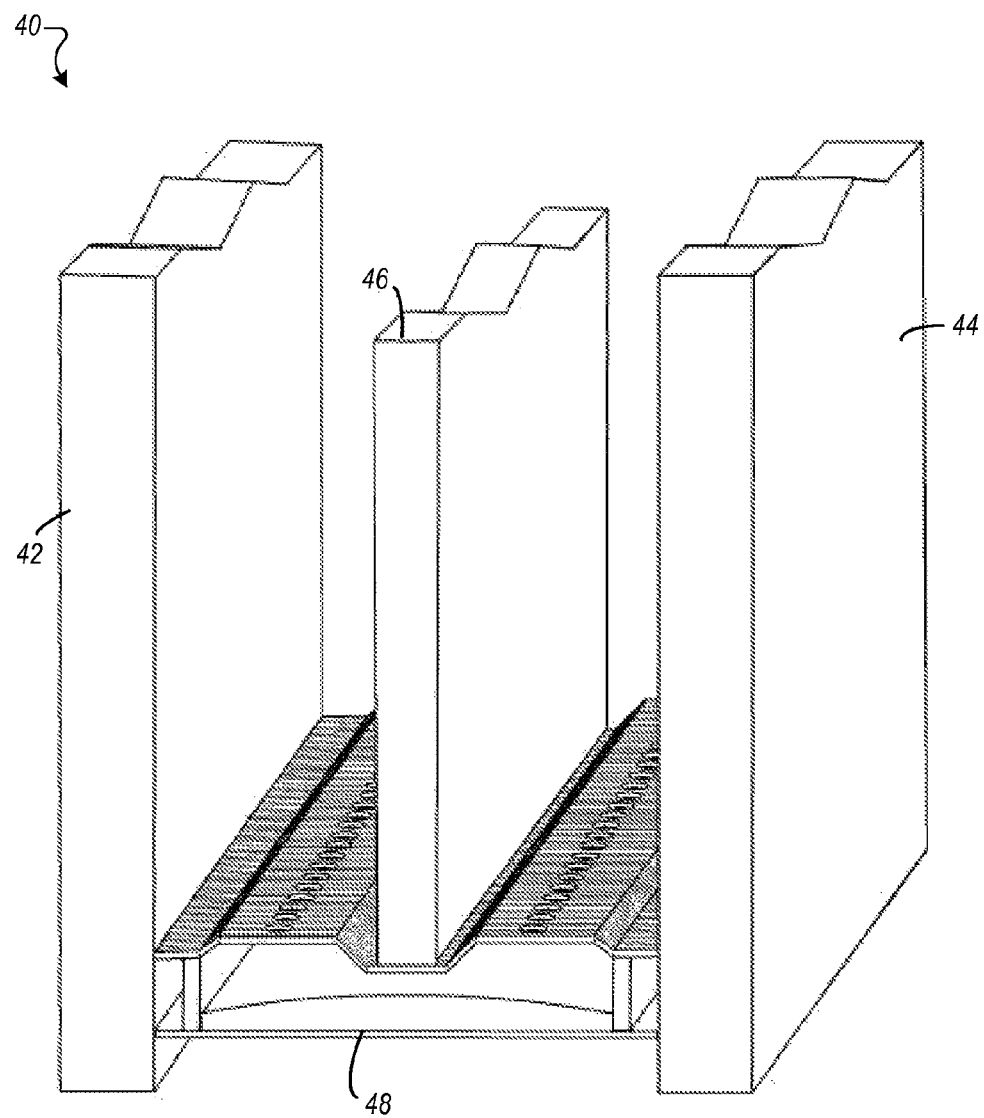
FIG. 16 depicts a schematic isometric view of a portion of another example window unit component consistent with the technology disclosed herein.

FIGS. 15 and 16 depict schematics of two additional types of window units that can be assembled using the technology disclosed herein. FIG. 15 depicts a window unit 30 having a first window pane 32, a second window pane 34, and a third window pane 36, where the third window pane 36 can be referred to as an intermediary pane. A first spacer 38 is disposed between the first 32 and second 34 window panes, and a second spacer 39 is disposed between the second 34 and third 36 window panes. The first, second, and third window panes 32, 34, 36 can be similar to the window panes described in the discussion of FIGS. 13 and 14, above. In addition, the first and second spacer can be similar to the spacer described in the discussion of FIGS. 13 and 14, above. The example window unit configuration depicted in FIG. 15 can be referred to as a triple pane window unit having a stacked configuration.

FIG. 16 depicts a partial isometric schematic of another example triple pane window unit that can be assembled with the technology disclosed herein. The window unit 40 has a first window pane 42, a second window pane 44, a third window pane 46, and a spacer 48 that sealingly engages the first window pane 42 and the second window pane. The third or intermediary window pane 46 is retained between the first window pane 42 and second window pane 44 by the spacer 48. Those having skill in the art will appreciate the multiple variations in spacer structure that will be compatible with the technology disclosed herein, as well as the variations in the overall window assembly structure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An insulated glass unit (IGU) assembly station comprising: an assembly table defining a planar table surface that is configured to receive first and second transparent window components, the table surface being positioned at an incline relative to a vertical direction that is perpendicular to a ground surface;
a conveyor assembly arranged approximately parallel to the ground surface and configured to (i) contact bottom edges of the first and second transparent window components and (ii) translate the first and second transparent window components along a translation pathway from a first end of the table surface to a second end of the table surface, the translation pathway being substantially parallel to the table surface; and a projection component adjacent to the assembly table and configured to engage the first transparent window component to translate at least a bottom portion of the first transparent window component between an initial position and a first assembly position offset from the translation pathway,
wherein the projection component movably translates back and forth substantially perpendicular to the table surface movably offsetting the conveyor assembly.

2. The IGU assembly station of claim 1, wherein the projection component has a receiving surface between first and second edges, the receiving surface being configured to receive a bottom edge of the first transparent window component, wherein the projection component further includes an extension surface configured to merge with the translation pathway upon extension of the projection component to the first assembly position.

3. The IGU assembly station of claim 2, further comprising a press bar extending substantially across the table surface and translatable both substantially parallel to the table surface and substantially perpendicular to the table surface, the press bar being configured to both push a front surface of the first transparent window component and support a back surface of the first transparent window component.

4. The IGU assembly station of claim 3, wherein the conveyor assembly is configured to translate the second transparent window component to a second assembly position where the second transparent window component is substantially parallel to the table surface and behind the first transparent window component after the first transparent window component is extended to the first assembly position, wherein the second transparent window component has a spacer frame attached thereto.

5. The IGU assembly station of claim 4, wherein in response to the conveyor assembly translating the second transparent window component to the second assembly position, the press bar is configured to push against the front surface of the first transparent window component to connect at least a top portion of the first transparent window component to at least a top portion of the spacer frame to form a partially-mated IGU.

6. The IGU assembly station of claim 5, wherein the partially-mated IGU includes a gap between the bottom portion of the first transparent window component and a bottom portion of the spacer frame for receiving gas to form a gas-filled IGU.

7. The IGU assembly station of claim 4, wherein the assembly table has a groove through the table surface, wherein the press bar includes a finger extending from the press bar towards the table surface, wherein the finger is configured to be received by the groove at the initial position of the first transparent window component, and wherein the finger is configured to engage a top edge of the first transparent window component and to support the back surface of the first transparent window component when the first transparent window component is offset from the table surface at the first assembly position.

8. The IGU assembly station of claim 7, wherein in response to the conveyor assembly translating the second transparent window component to the second assembly position, the finger is configured to disengage the top edge of the first transparent window component and the press bar is configured to push against the front surface of the first transparent window component to connect at least a top portion of the first transparent window component to at least a top portion of the spacer frame to form a partially-mated IGU.

9. The IGU assembly station of claim 8, wherein the partially-mated IGU includes a gap between the bottom portion of the first transparent window component and a bottom portion of the spacer frame for receiving gas to form a gas-filled IGU.

10. The IGU assembly station of claim 3, wherein the conveyor assembly is configured to translate the second transparent window component and a third transparent window component to a second assembly position where the second and third transparent window components are substantially parallel to the table surface and behind the first transparent window component after the first transparent window component is extended to the first assembly position, wherein the second and third transparent window components have one or more spacer frames attached thereto.

11. The IGU assembly station of claim 10, wherein in response to the conveyor assembly translating the second and third transparent window components to the second assembly position, the press bar is configured to push against the front surface of the first transparent window component to connect at least a top portion of the first transparent window component to at least a top portion of one of the one or more spacer frames to obtain a partially-mated IGU.

12. The IGU assembly station of claim 11, wherein the partially-mated IGU includes a gap between the bottom portion of the first transparent window component and a bottom portion of the one of the one or more spacer frames for receiving gas to form a gas-filled IGU.

13. The IGU assembly station of claim 10, wherein the assembly table has a groove through the table surface, wherein the press bar includes a finger extending from the press bar towards the table surface, wherein the finger is configured to be received by the groove at the initial position of the first transparent window component, and wherein the finger is configured to engage a top edge of the first transparent window component and to support the back surface of the first transparent window component when the first transparent window component is offset from the table surface at the first assembly position.

14. The IGU assembly station of claim 13, wherein in response to the conveyor assembly translating the second and third transparent window components to the second assembly position, the finger is configured to disengage the top edge of the first transparent window component and the press bar is configured to push against the front surface of the first transparent window component to connect at least a top portion of the first transparent window component to at least a top portion of one of the one or more spacer frames to obtain a partially-mated IGU.

15. The IGU assembly station of claim 14, wherein the partially-mated IGU includes a gap between the bottom portion of the first transparent window component and a bottom portion of the one of the one or more spacer frames for receiving gas to form a gas-filled IGU.

16. The IGU assembly station of claim 1, further comprising a press bar translatable both substantially parallel to the table surface and substantially perpendicular to the table surface, the press bar being configured to both push a front surface of the first transparent window component and support a back surface of the first transparent window component.

17. The IGU assembly station of claim 1, wherein the table surface defines a groove therethrough and the press bar further includes a finger extending from the press bar towards the table surface, wherein the finger is configured to be received by the groove at the initial position of the first transparent window component and to both (i) engage a top edge of the first transparent window component and (ii) support the back surface of the first transparent window component when the first transparent window component is offset from the table surface at the first assembly position.

18. An assembly system for an insulated glass unit (IGU), the system comprising:
an assembly table defining a planar table surface arranged at an incline with respect to a ground surface and configured to at least partially support first and second transparent window components;
a conveyor assembly configured to translate the first and second transparent window panes along a translation pathway that is approximately parallel to the table surface; and
a slide roller arranged in the translation pathway and defining a recessed receiving surface configured to receives a bottom edge of the first and second transparent window panes,
wherein the slide roller is extendable and retractable in an offset direction approximately perpendicular to the table surface and the translation pathway to translate at least a bottom portion of one of the first and second transparent window panes in the offset direction to a position offset from the translation pathway.

19. The system of claim 18, further comprising a press bar configured to contact both front and back surfaces of the first transparent window pane and to translate at least an upper portion of the first transparent window pane in the offset direction to another offset position.

20. The system of claim 19, wherein:
the first and second transparent window panes are sequentially translated along the translation pathway and the second transparent window pane includes a spacer frame attached about its perimeter;
the conveyor assembly is configured to translate the second transparent window component with the spacer frame attached thereto to a position between the table surface and the first transparent window component; and
the press bar is further configured to press the front surface of the first transparent window pane and the slide roller is configured to retract to its initial, non-offset position such that the first transparent window pane contacts the spacer frame.

* * * * *